April 22, 1952  R. J. BURROWS ET AL  2,593,977
RESILIENT WHEEL
Filed April 22, 1946  2 SHEETS—SHEET 2
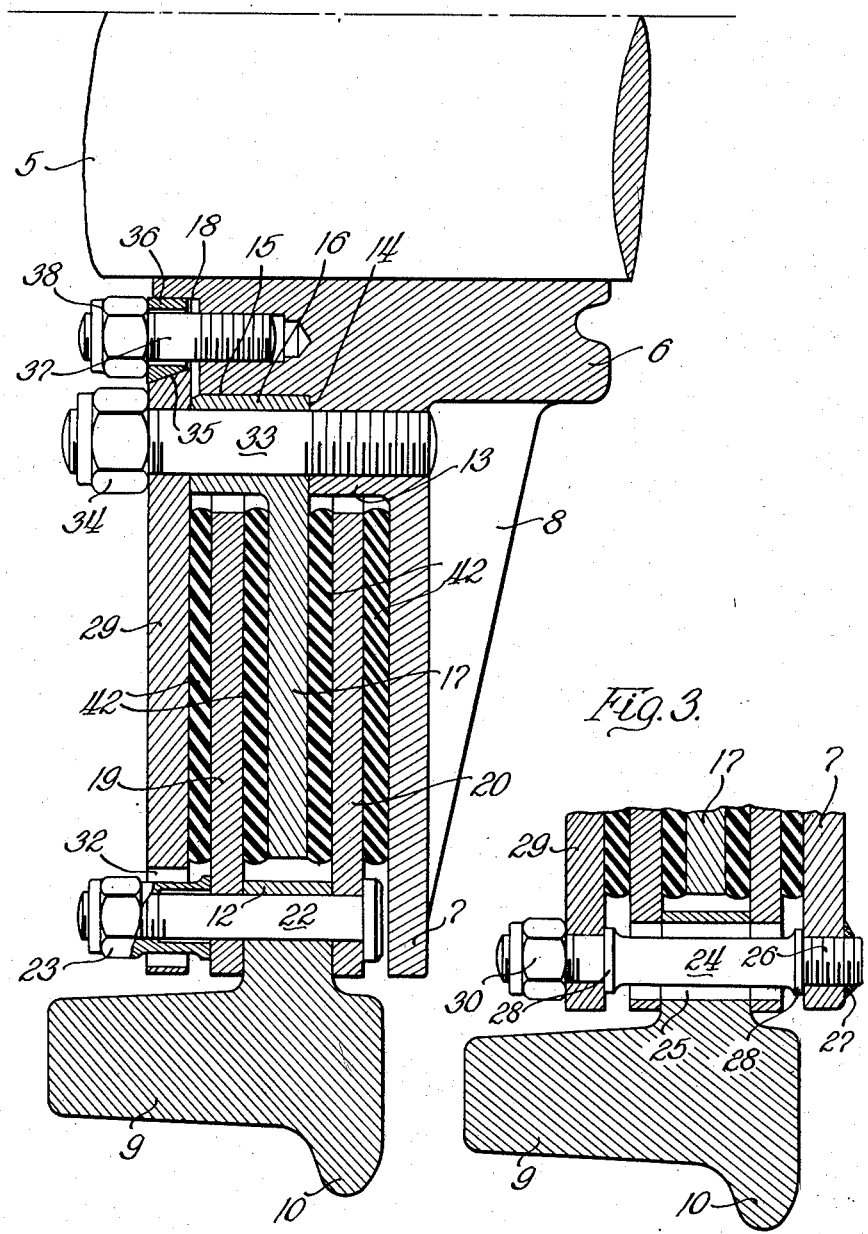
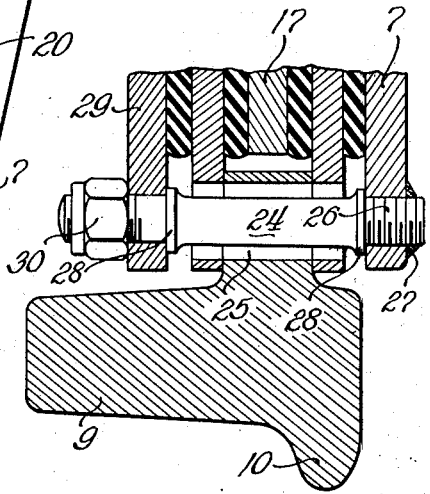
INVENTORS:
Robert J. Burrows
Alfred O. Williams
BY
Walter E. Schirmer
Atty.

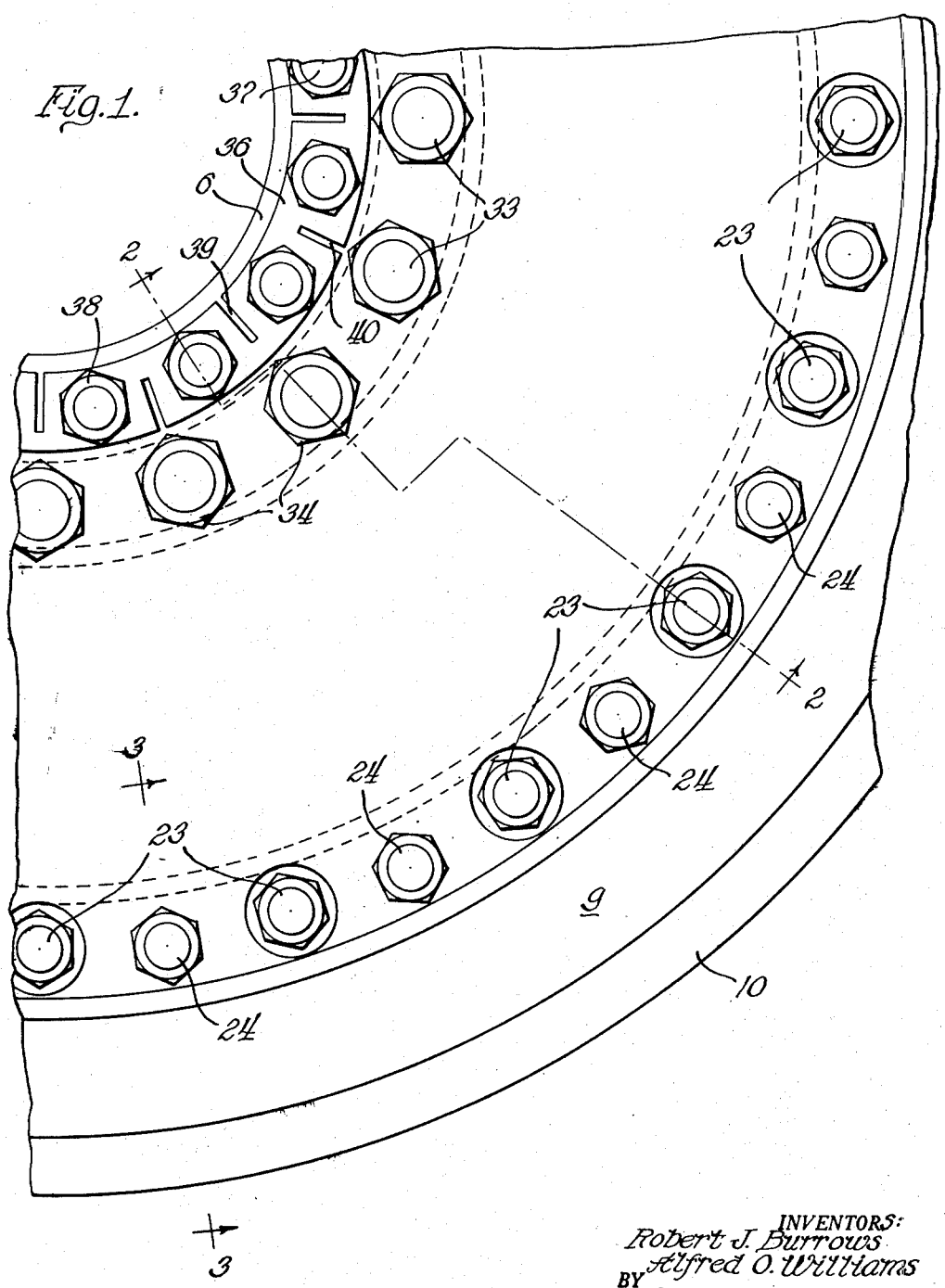

Patented Apr. 22, 1952

2,593,977

UNITED STATES PATENT OFFICE 2,593,977

RESILIENT WHEEL

Robert J. Burrows and Alfred O. Williams, Battle Creek, Mich., assignors to Clark Equipment Company, Buchanan, Mich., a corporation of Michigan Application April 22, 1946, Serial No. 664,041

6 Claims. (Cl. 295—11)

This invention relates to resilient wheels, and more particularly is directed to the construction and design of a resilient wheel for use on streetcars, subway cars, elevated trains and similar urban and high speed railcar equipment.

One of the primary objects of the present invention is to provide a resilient wheel of the type in which the rim or tread member is supported from the hub member through the media of rubber discs or sandwiches extending radially on opposite sides of flange members carried respectively by the hub and the rim members.

Another object of the present invention is to provide a construction of this general type in which substantially uniform loading is exerted at all points radially against the rubber members, whereby these discs will be held under substantially uniform axial compression throughout their radial extent, thus facilitating proper stressing of the rubber at all points so that no portion thereof is overloaded, and providing a uniform resiliency resulting in long life and proper ride characteristics.

Still another feature of the present invention is to design the radial flanges and plate members secured respectively to the hub and rim members in such manner that they will maintain true parallelism and will not be subjected to deflections caused by inaccurate mounting, thereby insuring the maintenance of uniform compression of these members against the interposed rubber discs.

Other objects and advantages of the present invention will appear more fully from the following detailed description which, taken in conjunction with the accompanying drawings, will disclose to those skilled in the art, the particular construction and operation of a preferred form of our present invention.

In the drawings:

Figure 1 is a partial elevational view of a wheel structure embodying the present invention;

Figure 2 is a sectional view taken substantially on line 2—2 of Figure 1; and

Figure 3 is a sectional view taken substantially on line 3—3 of Figure 1.

Referring now in detail to the drawings, there is disclosed an axle shaft 5 having pressed thereon the hub member 6. This hub member is provided adjacent one side thereof with the radial extending flange member 7, preferably provided with a plurality of radial extending reinforcing ribs 8 to provide increased stiffness of the flange member 7 in a radial direction. The rim member 9 is provided with the usual rail flange 10 and with a radially inwardly extending annular flange 12 of a diameter slightly less than the peripheral diameter of the flange 7.

The hub member 6 is provided with a boss portion or shoulder 13 having the machined radial surface 14 and the annular shoulder or groove 15 which is adapted to receive the hub portion 16 of a second flange member 17. The shoulders 14 and 15 determine accurately the position of the flange member 17 axially with respect to the flange 7 and radially with respect to the flange 12. The hub member 6 is provided also adjacent its opposite end with the reduced annular shoulder portion 18 for a purpose to be described in detail later.

Mounted on opposite lateral faces of the flange 12 of the rim member 9 are a pair of inwardly directed plates 19 and 20 which are secured in fixed position on the flange 12 by means of the stud 22 and the elongated bolt 23 which extends laterally to one side of the assembly. This clamps the two plates 19 and 20 fixedly in position, and it will be noted from Fig. 1 that the peripheral series of bolts or studs 23 have disposed therebetween a second series of circumferentially spaced studs 24, shown in detail in Fig. 3. The studs 24 are adapted to pass through enlarged openings 25 formed in the flange 12, whereby these studs have free radial movement within the openings 25. At one end the studs are threaded as at 26 into the peripheral portion of the flange 7, and may be welded thereto as indicated at 27. The studs are provided with opposed shoulders 28 providing for definite axial spacing between the flange 7 and the outer plate or disc 29 which is clamped at the opposite end of the stud by means of the nuts 30. Thus, a definite axial spacing is provided between the plates 19 and 20 mounted on the flange 12 and plates 7 and 29 adjacent their peripheral portions. It will be noted that the plates 29 are provided with enlarged openings 32 around the nuts 23 of the studs 22, thereby providing for relative movement of the rim member 9 relative the plate 29.

The flange member 17, which is interposed between the plates 19 and 20, is secured in position by the threaded stud 33 threaded into the boss portion 13 of the hub member 6 and projecting outwardly to receive the plate member 29, the two members 17 and 29 being thus firmly clamped in an axial position against the shoulder 14 by the nut 34 on the end of the stud 33. The inner peripheral surface of the plate 29 is tapered, as indicated at 35, and terminates short of the shoulder 18. A suitable wedge ring 36 is interposed in the radial space between the shoulder 18 and the tapered surface 39, and is provided with a correspondingly tapered surface engaging the inner peripheral surface of the plate 29 to lock it firmly against radial movement relative the hub 6. A suitable stud 37 acts through the nut 38 to force the wedge ring 36 axially inwardly. This wedge ring is preferably so formed as to have a certain amount of flexibility, this being provided by means of radial slots 39 and 40 milled into the ring 36 from the inner and outer peripheries thereof, respectively. This provides for wedging engagement to hold the plate 29 in fixed position relative to the shaft 5, and hub member 6, and also prevents any possibility of a chucking action of the plate 29.

Interposed between the plates 29, 19, 17, 20 and the flange 7 are annular rubber discs 42 which, as will be apparent from Fig. 2, are of a radial extent terminating just short of the boss 13 of the hub 6 and of the flange 12 of the rim member 9. The members 42 are so designed that they will be subject to appreciable lateral compression when the assembly is tightened into final position, and this compression will be uniform throughout the radial extent thereof due to the provision of the shoulder 14 and the controlled length of the hub 16 of the plate member 17, thereby determining the lateral spacing between the plates 29, 17 and 7. Similarly, the flange 12 determines the spacing between the plates 19 and 20, and the entire assembly is thereby so arranged that upon tightening of the nuts 23, 30, 34 and 38, uniform lateral compression will be exerted on the radial faces of each of the rubber members 42. The shoulders 28 of the stud member 24 are axially spaced a distance equal to the spacing between the flange 7 and the plate 29 adjacent the hub 6, whereby the plates 7 and 29 will remain in fixed parallel relationship and will also be parallel to the intermediate flange 17. It will thus be seen that the lateral compression of the disc members 42 will hold these members against slippage in a uniform relationship throughout the radial extent thereof so that relative movement between the shaft 5 and the rim member 9 will be accommodated by internal shear in the rubber members. The clearances about the stud 24 and between the flange 12 and periphery of the plate 17, as well as about the nut 23, accommodate this relative movement.

It is therefore believed apparent that we have provided a wheel structure using an appreciably greater amount of rubber in shear for providing the resilient action than was possible heretofore with the same axial thickness of wheel structure, and have further assured that such rubber elements will be maintained under uniform compression at all points.

We do not intend to be limited to the exact details of the construction herein disclosed, but only insofar as defined by the scope and spirit of the appended claims.

We claim:

1. In a resilient wheel, a hub member, an outboard flange plate radially spaced and in fixed axial relation at the outer end of said hub member, the inner peripheral edge of said outboard flange plate having a conical surface, an annular wedge ring disposed between the outer end of said hub member and engaging said conical surface to prevent radial displacement of said flange plate, said wedge ring having slots therein for rendering the same flexible, said slots extending alternately inwardly from the inner and outer peripheries of the wedge ring, and means for biasing said wedge ring substantially axially inwardly of said hub member whereby said wedge ring is adapted to be flexed so that it wedges itself between said hub member and said outboard flange plate.

2. In a resilient wheel, a hub member, a flange plate having an opening formed centrally thereof, said flange plate being disposed relative to said hub so that the inner periphery of the opening thereof is spaced radially outwardly of the outer periphery of the adjacent portions of said hub to define an annular recess between the outer periphery of said hub and the inner periphery of the opening in said flange plate, one of said peripheries having a seating surface formed on a portion of the surface of a cone, a wedge ring disposed in said annular recess, said wedge ring having an inner periphery defining the inner extent thereof conforming to the outer periphery of the hub and an outer periphery defining the outer extent thereof conforming to the inner periphery of said opening in said flange plate, and means extending through said wedge ring for biasing said wedge ring substantially axially inwardly of said hub member whereby said wedge ring is adapted to be flexed so that it wedges itself between said hub member and said flange plate.

3. In a resilient wheel, a hub member having an inboard radially extending flange, a second radially extending flange member seated on said hub member, an outboard flange plate having an opening formed centrally thereof, said outboard flange plate being disposed relative to said hub so that the inner periphery of the opening thereof is spaced radially outwardly of the outer periphery of the adjacent portions of said hub to define an annular recess between the outer periphery of said hub and the inner periphery of the opening in said flange plate, one of said peripheries having a seating surface formed as a portion of the surface of a cone, means for securing said inboard flange, second flange and outboard flange together, a wedge ring disposed in said annular recess, said wedge ring having an inner periphery defining the inner extent thereof conforming to the outer periphery of the hub and an outer periphery defining the outer extent thereof conforming to the inner periphery of said opening in said flange plate, means extending through said wedge ring for biasing said wedge ring substantially axially inwardly of said hub member whereby said wedge ring is adapted to be flexed so that it wedges itself between said hub member and said flange plate, a rim member, a pair of axially spaced radially inwardly extending flange plates secured to said rim member and extending into the spaces between said inboard flange and flange member and between said flange member and said outboard flange plate, and annular rubber discs disposed between the flanges carried by said hub and rim members.

4. In a resilient wheel, a hub member, a flange plate having an opening formed centrally thereof, said flange plate being disposed relative to said hub so that the inner periphery of the opening thereof is spaced radially outwardly of the outer periphery of the adjacent portions of said hub to define an annular recess between the outer periphery of said hub and the inner periphery of the opening in said flange plate, one of said peripheries having a seating surface formed on a portion of the surface of a cone, a wedge ring disposed in said annular recess, said wedge ring having an inner periphery defining the inner extent thereof conforming to the outer periphery of the hub and an outer periphery defining the outer extent thereof conforming to the inner periphery of said opening in said flange plate, said wedge ring having slots therein for rendering the same flexible, and means extending through said wedge ring for biasing said wedge ring substantially axially inwardly of said hub member whereby said wedge ring is adapted to be flexed so that it wedges itself between said hub member and said flange plate.

5. In a resilient wheel, a hub member, a flange plate having an opening formed centrally thereof, said flange plate being disposed relative to said hub so that the inner periphery of the opening thereof is spaced radially outwardly of the outer periphery of the adjacent portions of said hub to define an annular recess between the outer periphery of said hub and the inner periphery of the opening in said flange plate, one of said peripheries having a seating surface formed on a portion of the surface of a cone, a wedge ring disposed in said annular recess, said wedge ring having an inner periphery defining the inner extent thereof conforming to the outer periphery of the hub and an outer periphery defining the outer extent thereof conforming to the inner periphery of said opening in said flange plate, said wedge ring having slots therein for rendering the same flexible, said slots extending alternately inwardly from the inner and outer peripheries of the wedge ring, and means for biasing said wedge ring substantially axially inwardly of said hub member whereby said wedge ring is adapted to be flexed so that it wedges itself between said hub member and said flange plate.

6. In a resilient wheel, a hub member having an inboard radially extending flange, an outboard flange plate having an opening formed centrally thereof, said outboard flange plate being disposed relative to said hub so that the inner periphery of the opening thereof is spaced radially outwardly of the outer periphery of the adjacent portions of said hub to define an annular recess between the outer periphery of said hub and the inner periphery of the opening in said flange plate, one of said peripheries having a seating surface formed as a portion of the surface of a cone, means for securing said inboard and outboard flanges together, a wedge ring disposed in said annular recess, said wedge ring having an inner periphery defining the inner extent thereof conforming to the outer periphery of the hub and an outer periphery defining the outer extent thereof conforming to the inner periphery of said opening in said flange plate, means extending through said wedge ring for biasing said wedge ring substantially axially inwardly of said hub member whereby said wedge ring is adapted to be flexed so that it wedges itself between said hub member and said flange plate, a rim member, radially inwardly extending flange plate means secured to said rim and extending between said inboard and outboard flange plates, and resilient means between said flange plate means and said outboard flange plate and said inboard flange.

ROBERT J. BURROWS.
ALFRED O. WILLIAMS.

REFERENCES CITED

The following references are of record in the file of this patent:

UNITED STATES PATENTS

| Number | Name | Date |
|---|---|---|
| 1,424,203 | Keller | Aug. 1, 1922 |
| 1,969,193 | Woodward | Aug. 7, 1934 |
| 2,151,831 | Buccicone | Mar. 28, 1939 |
| 2,188,271 | Swain | Jan. 23, 1940 |
| 2,270,622 | Burton | Jan. 20, 1942 |
| 2,290,661 | Williams | July 21, 1942 |
| 2,328,660 | Malmquist | Sept. 7, 1943 |
| 2,396,029 | Stewart | Mar. 5, 1946 |
| 2,460,631 | Fawick | Feb. 1, 1949 |

FOREIGN PATENTS

| Number | Country | Date |
|---|---|---|
| 314,575 | Italy | Jan. 31, 1934 |
| 426,697 | France | July 12, 1911 |
| 484,890 | Great Britain | May 11, 1938 |